Aug. 22, 1961  E. C. HICKS  2,996,791
METHOD OF MANUFACTURING A COMPOSITE ROTOR
Filed Nov. 23, 1956   2 Sheets-Sheet 1
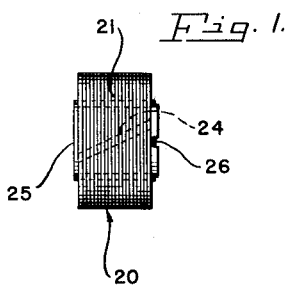
Fig. 1.
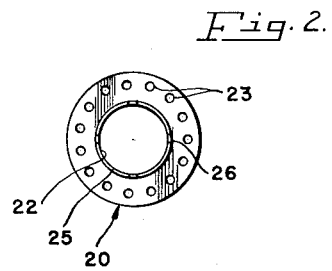
Fig. 2.
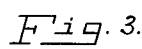
Fig. 3.
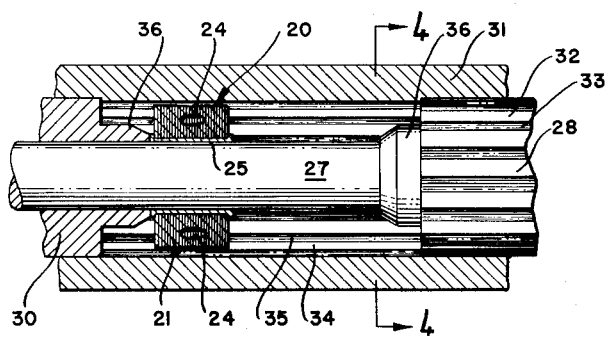
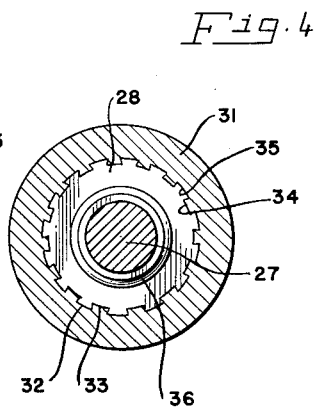
Fig. 4
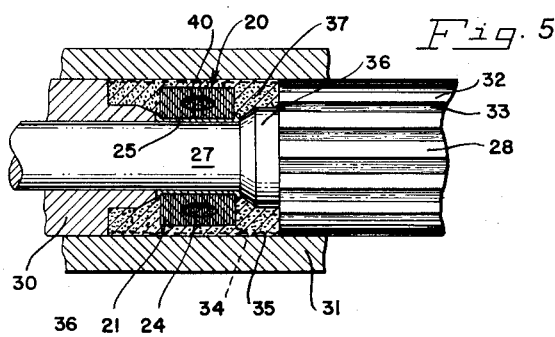
Fig. 5
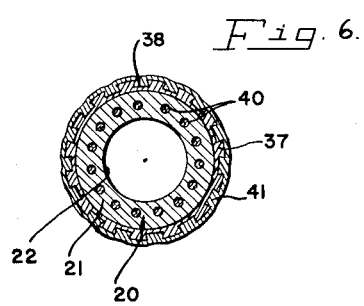
Fig. 6.
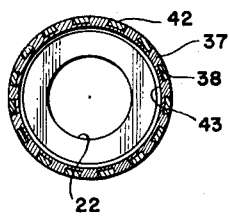
Fig. 7.
INVENTOR,
Edward C. Hicks,
BY
ATTORNEY.

Aug. 22, 1961   E. C. HICKS   2,996,791
METHOD OF MANUFACTURING A COMPOSITE ROTOR
Filed Nov. 23, 1956   2 Sheets-Sheet 2
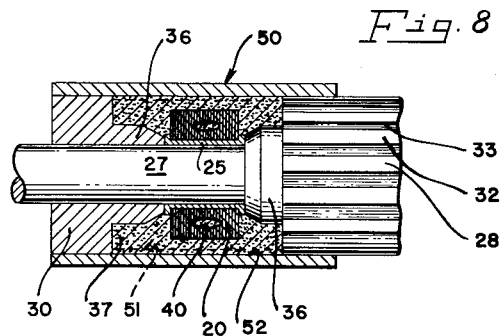
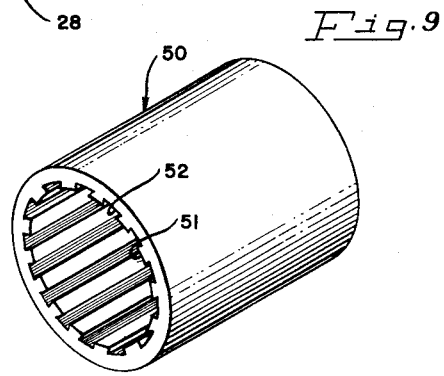
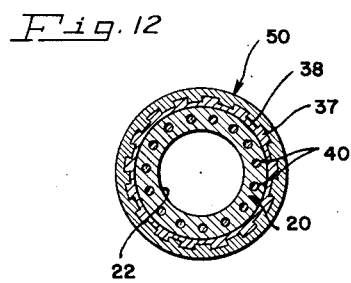
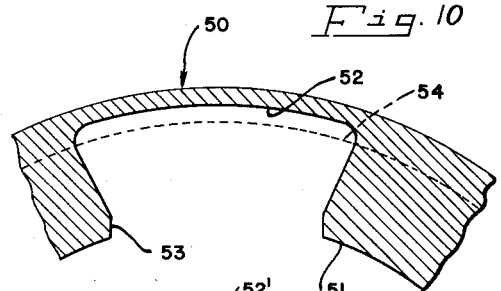
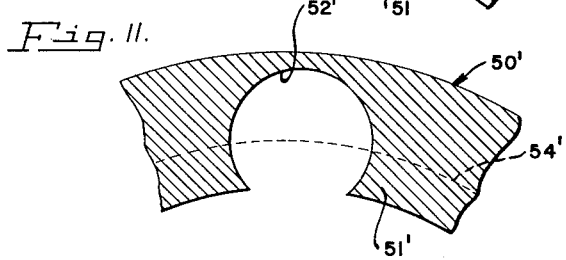
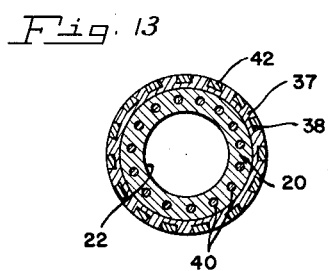
INVENTOR,
Edward C. Hicks,
BY
ATTORNEY United States Patent Office 2,996,791
Patented Aug. 22, 1961

2,996,791
METHOD OF MANUFACTURING A COMPOSITE ROTOR
Edward C. Hicks, Tucson, Ariz., assignor to Hughes Aircraft Company, Culver City, Calif., a corporation of Delaware
Filed Nov. 23, 1956, Ser. No. 624,156
2 Claims. (Cl. 29—155.53)

The invention finds general utility in the field of rotors and the like, and relates specifically to a method of manufacturing a composite rotor.

Contemporary requirements necessitate the use of relatively small rotors for use in electrical devices such as, for example, electric motors, gyroscopes and the like. In aircraft control mechanisms, it is required that stabilization devices and the rotors employed therewith be high precision structures that must also be relatively small, as compared to similar devices used in other fields. For example, in rate gyroscopes of the type disclosed in Patent Number 2,753,718, issued on July 10, 1956, to Spencer D. Howe, precise control may only be obtained with precision components including the rotor structure.

In composite rotors of the type disclosed herein, it is necessary that the rotor structure include an iron core surrounded by a non-permeable material such as beryllium copper, for example, and that a non-permeable squirrel cage structure be integrally associated both with the iron core and the rotor body defined by the copper portions. Outer surfaces of the rotor body are provided with circumferentially spaced longitudinally extending iron bars or strips that must be intimately secured to the copper material. It is essential that outer surfaces of the iron bars be coextensive with a peripheral surface of the rotor body.

Inasmuch as rotors of this type are required to operate at a high r.p.m., it is essential that an adequate bond be provided between the iron bars and the rotor body in order that centrifugal action will not separate these bars from the rotor body during use of the device. Additionally, it is necessary, both from mass production and economic standpoints, that the means by which the iron bars are secured in position be as simple as possible, consistent with the desired end results.

Heretofore, many different methods have been employed in attempts toward securing the iron bars in the outer periphery of the rotor body. These attempts have included precise machining of grooves in the rotor body and thereafter press fitting of the bars therein. Also such machining has been employed to produce dovetail shaped grooves in the rotor body in an effort to insure retention of the iron bars. Furthermore, iron bars have been silver soldered in position in grooves formed in the periphery of the rotor body. In all of these instances, cited by way of example relative to prior manufacturing techniques, intimate contact between adjacent surfaces of the iron bars and the rotor body is not always possible, due to the necessity for the provision of normal manufacturing tolerances. Accordingly, a lack of reliability may be expected in the bond between the iron bars and the rotor body in connection with at least a small percentage of the number of bars applied. This lack of reliability, even though relatively small, is prohibitive when rotor devices of this type are employed in structures such as control devices and gyroscopes used in guidance arrangements for missiles, rockets, projectiles and the like.

Accordingly, it is one important object of the present invention to provide a novel method of manufacturing a composite rotor.

Another object of the invention is to provide a novel means for producing a composite rotor and simultaneously creating an integral, non-permeable squirrel cage together with appropriate grooves in an outer periphery of the rotor body for reception and retention of iron bars.

A further important object of the invention is to provide a novel composite rotor manufacturing method wherein means are provided intimately to confine iron bars in a peripheral area of a rotor body.

Still another object of the invention is to provide a rapid, economical and practical method for producing a composite rotor having resulting characteristics commensurate with precision end uses of the rotor.

Another and further important object of the invention will become apparent from the disclosures in the following detailed specification, appended claims and accompanying drawings, wherein:

FIGURE 1 is a side elevational view of a stack of iron discs forming the core of the present composite rotor;

FIG. 2 is an end view of the stack of core discs shown in FIG. 1;

FIG. 3 is a partially diagrammatic, longitudinal sectional view showing a mechanism that may be employed for forming a non-permeable rotor body in and about the stack of iron discs;

FIG. 4 is a transverse sectional view through the mechanism of FIG. 3 and taken substantially as indicated by line 4—4, FIG. 3;

FIG. 5 is another view of the device shown in FIG. 3, with components in different positions;

FIG. 6 is a transverse sectional view through a completed rotor formed by the mechanism of FIGS. 3 and 5 and following completion of one embodiment of one step in the process relative to application of a molten iron spray coating thereto;

FIG. 7 is a transverse sectional view through the rotor following external and internal machine operations thereon;

FIG. 8 is a view similar to FIG. 5 showing a powdered metal forming mechanism in association with an alternative step in the process of the invention;

FIG. 9 is a detail isometric view showing the outer sleeve portion of the mechanism employed in the device of FIG. 8;

FIG. 10 is an enlarged fragmentary sectional view showing one form of the detail configuration of internal grooves employed in the sleeve of FIG. 9;

FIG. 11 is an enlarged fragmentary sectional view showing another configuration for grooves in the sleeve of FIG. 9;

FIG. 12 is a transverse sectional view through a composite rotor following the forming step by the mechanism of FIG. 8, and FIG. 13 is a transverse sectional view similar to FIG. 12, following machining of the outer circumferential and internal areas of the composite rotor structure.

With reference to the drawings, the method of the present invention is adapted for use in forming a composite rotor. The rotor has imbedded within it an iron core that is shown in detail in FIGS. 1 and 2, as at 20. The iron core is composed of a plurality of identical iron plates or discs 21, each having a relatively large central annular opening 22 therethrough. Each of the discs 21 is provided with a plurality of relatively small laterally extending circumferentially spaced openings 23. As the discs 21 are placed in association with each other, slight misalignment of the adjacent openings 23 in adjacent discs is intentionally provided, whereby to create a plurality of laterally extending passages through the core 20. One of these passages is shown at 24 in FIG. 1 wherein is may be seen that the angle thereof is approximately 15 degrees displaced from the axis of the core. To insure maintenance of the relative positions of the discs 21, during other steps of the process, a shouldered cylindrical retainer member 25 is positioned within the openings 22 and crimped outwardly as at 26 over the face of an endmost of the discs 21.

With reference to FIGS. 3, 4 and 5, to accomplish the heat and pressure forming step of the present process, the core 20 is initially placed in a sintered metal molding device illustrated in these figures and slidably disposed on a rod 27 that is connected to a ram 28. The rod 27 is slidably disposed through an end gate 30, the outer periphery of the gate 30 being secured to a generally cylindrical casing 31. The ram 28 is provided with a series of lands and dovetail shaped grooves 32 and 33 thereabout, that are circumferentially spaced and longitudinally extending and which are adapted longitudinally to mate with similar lands and dovetail shaped grooves 34 and 35 formed longitudinally in the inner surface of the casing 31. The ram 28 and the gate 30 are each provided with inwardly directed contoured bosses 36, with the core retainer 25 being initially positioned in abutting relationship with a lateral end of the boss 36 associated with the gate 30. The particular transverse configuration of the device shown in FIG. 3 is illustrated in section in FIG. 4. It should be recognized that the structure of the molding arrangement shown in FIGS. 3, 4 and 5 is illustrated partially diagrammatically, the necessary proper seals, loading gates, actuating mechanisms and the like, having been omitted from the illustration as being old and well known and normally provided in molds of this nature.

After the core 20 has been positioned on the rod 27, the space between the facing ends of the ram 28 and the gate 30 is at least partially filled with a non-permeable powdered metal material such as, for example, powdered beryllium copper. Thereafter, as shown in FIG. 5, the ram 28 is moved in a direction toward the gate 30, whereby to compress the powdered material contained therebetween under sufficient pressure as to cause the metallic particles to be tightly engaged with respect to each other and also to flow through the passages 24 in the core 20. The pressure of forming operation serves to create considerable heat energy thereby sintering the metallic particles and creating a homogeneous mass having low porosity and of the specific configuration ultimately desired. The rotor body thus formed is indicated in 37 in FIG. 5. It is to be noted that the outer periphery of the rotor body is provided with a plurality of circumferentially spaced longitudinally extending grooves as indicated at 38 in FIG. 6. It is also to be noted that the desired non-permeable squirrel cage is established by the forcing of the powdered metallic material through the passages 24, thus to provide squirrel cage bars 40 that are integral with the rotor body 37.

It is characteristic of sintering operations that the end product will accurately depict the detail, specific configuration of the mold. Additional sintering may be accomplished by heating the formed product following removal from the mold and to a temperature sufficient to cause bonding between the individual metallic particles while not being sufficiently high as to melt the metallic material.

In FIG. 6, one means is disclosed for intimately depositing iron material in the grooves 38 in the outer periphery of the rotor body 37. This means includes the application of molten iron, shown at 41, to the outer surface of the rotor body 37, in the grooves 38 and overlying the areas of the body adjacent to the grooves 38. This molten iron may be deposited by any well known means such as, for example, as by metal spraying thereon.

Thereafter, as shown in FIG. 7, the outer surface of the composite rotor is machined to remove excess iron therefrom and to leave longitudinally extending iron bars 42 intimately in the grooves 38. Other portions of the rotor body are also machined as at 43 to provide the required ultimate configuration of the rotor.

In FIGS. 8 through 13, another method of intimately applying iron bars to the periphery of the rotor is illustrated. In this form of the invention, the core 20 is positioned on the rod 27 that is carried by the ram 28. The end gate 30 is disposed within an annular iron sleeve 50 and secured in one end thereof. The sleeve 50 is shown in detail in FIG. 9 and includes longitudinally extending lands and dovetail grooves 51 and 52 that are adapted to mate with the lands and grooves 32 and 33 on the ram 28. When the rotor body 37 is formed by movement of the ram 28 toward the end gate 30 and compression of the powdered metallic material therebetween, this powdered metallic material is also forced into intimate contact with the lands and grooves 51 and 52 of the sleeve 50. The assembly thus provided is shown in section in FIG. 12, with the sleeve 50 being disposed about the rotor body 37 and the lands 51 thereof being intimately disposed in the grooves 28. Thereafter, as shown in FIG. 13, the bars 42 only are left in the grooves 38 as by a suitable machining operation to remove all portions of the sleeve, with the exception of the lands 51.

As shown in FIGS. 10 and 11, the dovetail shaped grooves 52 in the sleeve 50, which may be formed therein as by broaching, for example, have sharp corners, as at 53, removed. Following disposition of the powdered material into the confines of the sleeve 50, the sleeve may thereafter be machined to the approximate area of the dotted line 54, whereby to create the structure as shown in FIG. 13. FIG. 11 illustrates a modification of this structure wherein a sleeve 50' is provided with longitudinal grooves 52' that are generally semicircular in cross-section and defined circumferential sides for the lands 51'. In this instance, following heat and pressure forming of the rotor body, the sleeve 50' may be machined inwardly to an approximate point as indicated by a dotted line 54', whereby to leave the iron material in the grooves 38 of the rotor body.

It may thus be seen that the composite rotor manufacturing method described herein enables production of a rotor that is precise dimensionally, which has the desired squirrel cage construction and which is provided with circumferentially spaced iron bars about the periphery thereof that are secured in position in such a manner as to be retained in the grooves 38, even though the rotor may be subjected to high speed rotation.

Having thus described the invention and the present embodiments thereof, it is desired to emphasize the fact that many further modifications may be resorted to in a manner limited only by a just interpretation of the following claims.

I claim:

1. The method of manufacturing a rotor comprising, in combination, the steps of: stacking a plurality of ring-shaped iron discs having radially spaced openings therethrough in positions to define an iron core having an annular central bore and a plurality of elongated passageways defined by said openings and each disposed at a common angle to an axis of said core and said central bore therethrough; securing said discs in said positions; supporting said core against axial and lateral movement; die forming a non-permeable powdered metallic material about said core and through said passageways to provide a solid rotor body about said core and solid cage bars in said passageways; simultaneously with said die forming step, moldably forming circumferentially spaced longitudinal grooves in an outer peripheral surface of said rotor body; spraying said peripheral surface and said grooves with a molten iron material, whereby to coat said surface and fill said grooves; and rotatably machining said coat of iron from said surface while leaving said iron in said grooves to define a circumferentially smooth outer surface for said rotor.

2. The method of manufacturing a rotor comprising, in combination, the steps of: stacking a plurality of ring-shaped iron discs having radially spaced openings therethrough in positions to define an iron core having an annular central bore and a plurality of elongated passageways defined by said openings and each disposed at a common angle to an axis of said core and said central bore therethrough; securing said discs in said positions and through said bore in said core; temporarily supporting said core against axial and lateral movement; die forming a non-permeable powdered metallic material about said core and through said passageways, whereby through heat and pressure to provide a solid rotor body about said core and solid cage bars in said passageways; simultaneously with said die forming step, moldably forming circumferentially spaced longitudinal grooves in an outer peripheral surface of said rotor body; removing said rotor from said axial and lateral support; removing means for originally securing said discs in said positions; spraying said peripheral surface and said grooves with a molten iron material, whereby to coat said surface and fill said grooves; and rotatably machining said coat of iron from said surface while leaving said iron in said grooves to define a circumferentially smooth outer surface for said rotor.

References Cited in the file of this patent

UNITED STATES PATENTS

| | | |
|---|---|---|
| 1,766,865 | Williams et al. | June 24, 1930 |
| 2,060,260 | Spengler | June 20, 1935 |
| 2,125,970 | Waters | Aug. 9, 1938 |
| 2,138,661 | Maxwell | Nov. 29, 1938 |
| 2,244,109 | Klein | June 3, 1941 |
| 2,387,073 | Horlacher | Oct. 16, 1945 |
| 2,423,700 | Hardy | July 8, 1947 |
| 2,528,154 | Ludwig | Oct. 31, 1950 |
| 2,588,421 | Shepard | Mar. 11, 1952 |